United States Patent
Ozeki et al.

(10) Patent No.: US 12,330,620 B2
(45) Date of Patent: Jun. 17, 2025

(54) POWER SUPPLY CONTROL DEVICE, CONTROL METHOD, AND STORAGE MEDIUM

(71) Applicant: TOYOTA JIDOSHA KABUSHIKI KAISHA, Toyota (JP)

(72) Inventors: Akihiro Ozeki, Chiryu (JP); Kohei Nishi, Kariya (JP); Masayuki Suzuki, Toyota (JP); Hatsuki Suganuma, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 18/168,670

(22) Filed: Feb. 14, 2023

(65) Prior Publication Data
US 2023/0339449 A1 Oct. 26, 2023

(30) Foreign Application Priority Data
Apr. 22, 2022 (JP) ................... 2022-070712

(51) Int. Cl.
*B60W 30/18* (2012.01)
*B60R 16/023* (2006.01)
*B60R 16/04* (2006.01)
*B60W 10/26* (2006.01)
*H02J 1/10* (2006.01)
*B60W 60/00* (2020.01)

(52) U.S. Cl.
CPC ......... *B60W 10/26* (2013.01); *B60R 16/0231* (2013.01); *B60R 16/04* (2013.01); *H02J 1/106* (2020.01); *B60W 2720/10* (2013.01)

(58) Field of Classification Search
CPC .......... B60W 30/18; B60W 30/18109; B60W 50/0029; B60W 50/00; B60W 50/08; B60W 60/00
See application file for complete search history.

(56) References Cited

U.S. PATENT DOCUMENTS

| | | | |
|---|---|---|---|
| 2011/0320109 A1* | 12/2011 | Polimeno | B60L 50/16 701/113 |
| 2018/0009400 A1* | 1/2018 | Lee | B60R 16/03 |
| 2018/0041048 A1* | 2/2018 | Yang | B60R 16/03 |
| 2020/0298888 A1 | 9/2020 | Ozeki et al. | |
| 2023/0086986 A1* | 3/2023 | Park | B60R 16/0238 701/26 |

FOREIGN PATENT DOCUMENTS

JP 2020156228 A 9/2020

* cited by examiner

*Primary Examiner* — Tan Q Nguyen
(74) *Attorney, Agent, or Firm* — Dickinson Wright, PLLC

(57) ABSTRACT

A power supply control device for controlling power supply to a load of a vehicle using a first battery and a second battery, the power supply control device comprising: an acquisition unit that acquires a power supply state of the vehicle; a diagnostic unit that performs diagnosis of the second battery when the power supply state of the vehicle is switched from off to on; and a control unit that controls an electrical connection state between the load and the second battery, wherein the control unit controls the first state in which power can be supplied from the second battery to the load when the diagnosis unit diagnoses that the second battery is normal.

7 Claims, 4 Drawing Sheets

< 1ST STATE (REDUNDANT MODE) >

< SECOND STATE (PASS MODE) >

< 3RD STATE (BACKUP MODE) >

POWER SUPPLY CONTROL DEVICE, CONTROL METHOD, AND STORAGE MEDIUM

CROSS-REFERENCE TO RELATED APPLICATION

This application claims priority to Japanese Patent Application No. 2022-070712 filed on Apr. 22, 2022, incorporated herein by reference in its entirety.

BACKGROUND

1. Technical Field

The present disclosure relates to a power supply control device and the like that control a power supply system including a plurality of batteries for supplying power to a load of a vehicle in a redundant manner.

2. Description of Related Art

Japanese Unexamined Patent Application Publication No. 2020-156228 (JP 2020-156228 A) discloses a power supply system for a vehicle in which a power supply is made redundant using a main first battery and a backup second battery. The above publication discloses that, in this power supply system, the second battery is connected to a load together with the first battery to redundantly configure the power supply during autonomous driving of the vehicle.

SUMMARY

In recent years, various controls (for example, brake control) in vehicles have been motorized. For this reason, redundant power supply to a predetermined load (for example, a brake actuator) is required in some cases in addition to during autonomous driving.

The present disclosure has been made in view of the above issue, and an object of the present disclosure is to provide, in a power supply system that uses a redundant configuration, a power supply control device and the like capable of executing control to establish a redundant power supply configuration with respect to a load when a backup battery is normal.

In order to solve the above issue, an aspect of the disclosed technology is a power supply control device that controls power supply to a load of a vehicle that uses a first battery and a second battery, and the power supply control device includes: an acquisition unit that acquires a power supply state of the vehicle; a diagnostic unit that performs diagnostics of the second battery when the power supply state of the vehicle is switched from off to on; and a control unit that controls an electrical connection state between the load and the second battery. The control unit executes control to establish a first state in which power is able to be supplied from the second battery to the load when the diagnostic unit diagnoses that the second battery is normal.

According to the power supply control device and the like of the present disclosure, in the power supply system that uses the redundant configuration, it is possible to redundantly supply power to the load when the second battery is normal in the case where the power supply state of the vehicle is on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the power supply control device of the present disclosure, when the ignition switch of the vehicle is turned ON, a redundant sub-battery is diagnosed, and when it is determined that the sub-battery is normal, a power supply system having a redundant configuration is formed with respect to the load of the primary system and the load of the secondary system by both the main battery and the sub-battery. As a result, the vehicle can be extended to a state in which necessary functions can be backed up. Hereinafter, an embodiment of the present disclosure will be described in detail with reference to the drawings.

Embodiment

Configuration

Figure 1:
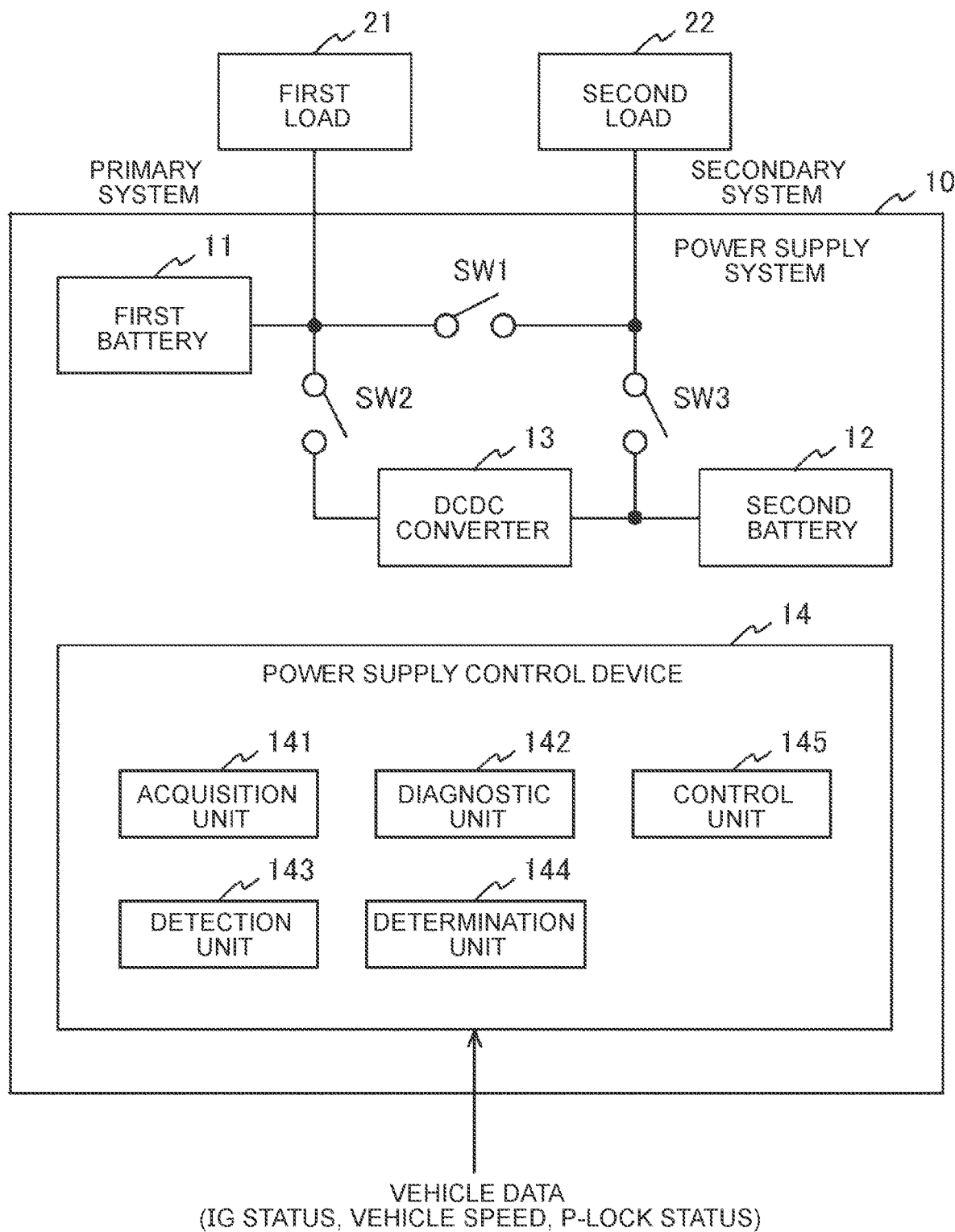
FIG. 1 is a diagram illustrating a schematic configuration of a power supply system including a power supply control device according to an embodiment of the present disclosure.

FIG. 1 is a diagram illustrating a schematic configuration of a power supply system 10 including a power supply control device 14 according to an embodiment of the present disclosure. The power supply system 10 illustrated in FIG. 1 includes a first battery 11, a second battery 12, a DCDC converter 13, a power supply control device 14, a first switch SW1, a second switch SW2, and a third switch SW3.

The power supply system 10 of the present disclosure is configured to be capable of redundant power supply to the first load 21 and the second load 22, which are in-vehicle devices provided redundantly, such as an automatic driving function and an electric brake function.

The first battery 11 is a secondary battery configured to be chargeable and dischargeable, such as a lead storage battery. The first battery 11 is a main battery that is connected to the first load 21 and the second load 22 so as to be capable of supplying power, regardless of whether a redundant power supply configuration is required or not. The first battery 11 is directly connected to the first load 21. The first battery 11 is connected to the second loads 22 via the first switch SW1 or DCDC converter 13 and the third switch SW3. The first battery 11 is connected to the second battery 12 via the second switch SW2 and DCDC converter 13.

The second battery 12 is a secondary battery configured to be chargeable and dischargeable, such as a lithium ion battery. The second battery 12 is a sub-battery connected to the second load 22 so as to be able to supply power when a redundant power supply configuration is required, and is redundantly provided to back up the first battery 11. The second battery 12 is connected to the second loads 22 via the third switch SW3.

The first load 21 is a device mounted on the vehicle, and is a device configured to operate with electric power of the first battery 11. The second load 22 is a device mounted on the vehicle for redundantly providing a part or all of the first load 21, and is configured to operate with electric power from the first battery 11 and the second battery 12. The second load 22 is a load that is required to be operated in place of the first load 21 that is no longer operated due to a failure of the first battery 11 or the like, and can be an important load related to the safe running of the vehicle. For example, the second load 22 may indicate a load that has a function of safely moving the vehicle in an emergency during automatic driving.

The first switch SW1, the second switch SW2, and the third switch SW3 are configured to be openable and closable based on a control (instruction) of the power supply control device 14. Semiconductor relays, exciting mechanical relays, and the like can be used for these switches.

DCDC converter 13 is a power converter that is capable of converting the inputted power into power of a predetermined voltage and outputting the converted power based on control (instruction) of the power supply control device 14. In DCDC converter 13, the primary side is connected to the first battery 11 via the second switch SW2, and the secondary side is connected to the second battery 12. DCDC converter 13 can be a bi-directional DCDC converter having a function of voltage-converting the power on the primary side and outputting the power on the secondary side, and a function of voltage-converting the power on the secondary side and outputting the power on the primary side.

The power supply control device 14 is configured to control power supply from the first battery 11 and the second battery 12 of the power supply system 10 to the first load 21 and the second load 22 based on the state of the first battery 11 and the second battery 12 and the vehicle state. The power supply control device 14 includes an acquisition unit 141, a diagnostic unit 142, a detection unit 143, a determination unit 144, and a control unit 145.

The acquisition unit 141 acquires the power supply state of the vehicle. Specifically, the acquisition unit 141 acquires, from another in-vehicle device (not shown), information regarding a state (IG state) of an ignition switch that is a switch for operating the power supply system 10 of the vehicle.

The diagnostic unit 142 performs diagnosis of the first battery 11 or the second battery 12 at a predetermined timing. In the present embodiment, the diagnosis of the first battery 11 is performed when the power supply state of the vehicle acquired by the acquisition unit 141 is switched from ON (IG-ON) to OFF (IG-OFF), and the diagnosis of the second battery 12 is performed when the power supply state of the vehicle acquired by the acquisition unit 141 is switched from OFF (IG-OFF) to ON (IG-ON). This diagnosis is typically performed by determining whether the battery is normal or abnormal based on a physical quantity (voltage, current, temperature, and the like) indicating a state of the battery that can be acquired from various sensors. Note that the diagnosis method of the battery is not the main object of the present application, and thus description thereof will be omitted, but a well-known method can be used.

The detection unit 143 detects the speed of the vehicle. The speed of the vehicle can be detected, for example, by acquiring information on the vehicle speed from a vehicle speed sensor (not shown) mounted on the vehicle.

The determination unit 144 determines the parking lock state of the vehicle. The parking lock state can be determined, for example, by acquiring, from an electric parking brake (EPB) system, information regarding a P lock state indicating that the parking brake lock process is completed.

The control unit 145 controls DCDC converter 13, the first switch SW1, the second switch SW2, and the third switch SW3 to control electric power from the first battery 11 and the second battery 12 to the first load 21 and the second load 22. The control unit 145 of the present embodiment controls the electrical connection state between the second battery 12 and the second load 22 based on the diagnosis result of the diagnostic unit 142. The connection state controlled by the control unit 145 includes a first state (redundant mode) in which power can be supplied from the second battery 12 to the second load 22, a second state (pass mode) in which the second battery 12 is electrically disconnected from the second load 22, and a third state (backup mode) in which power is supplied from the second battery 12 to the second load 22 in an emergency. The control of the connection state executed by the control unit 145 will be described later.

The above-described power supply control device 14 typically includes a processor such as a microcomputer, a memory, an input/output interface, and the like. The power supply control device 14 realizes all or a part of the functions of the acquisition unit 141, the diagnostic unit 142, the detection unit 143, the determination unit 144, and the control unit 145 by the processor reading and executing the program stored in the memory. In the present embodiment, the connection state of the power supply system 10 is controlled by one control unit 145, but independent control units may be provided for the control of the primary system and the control of the secondary system.

Control

Figure 2:
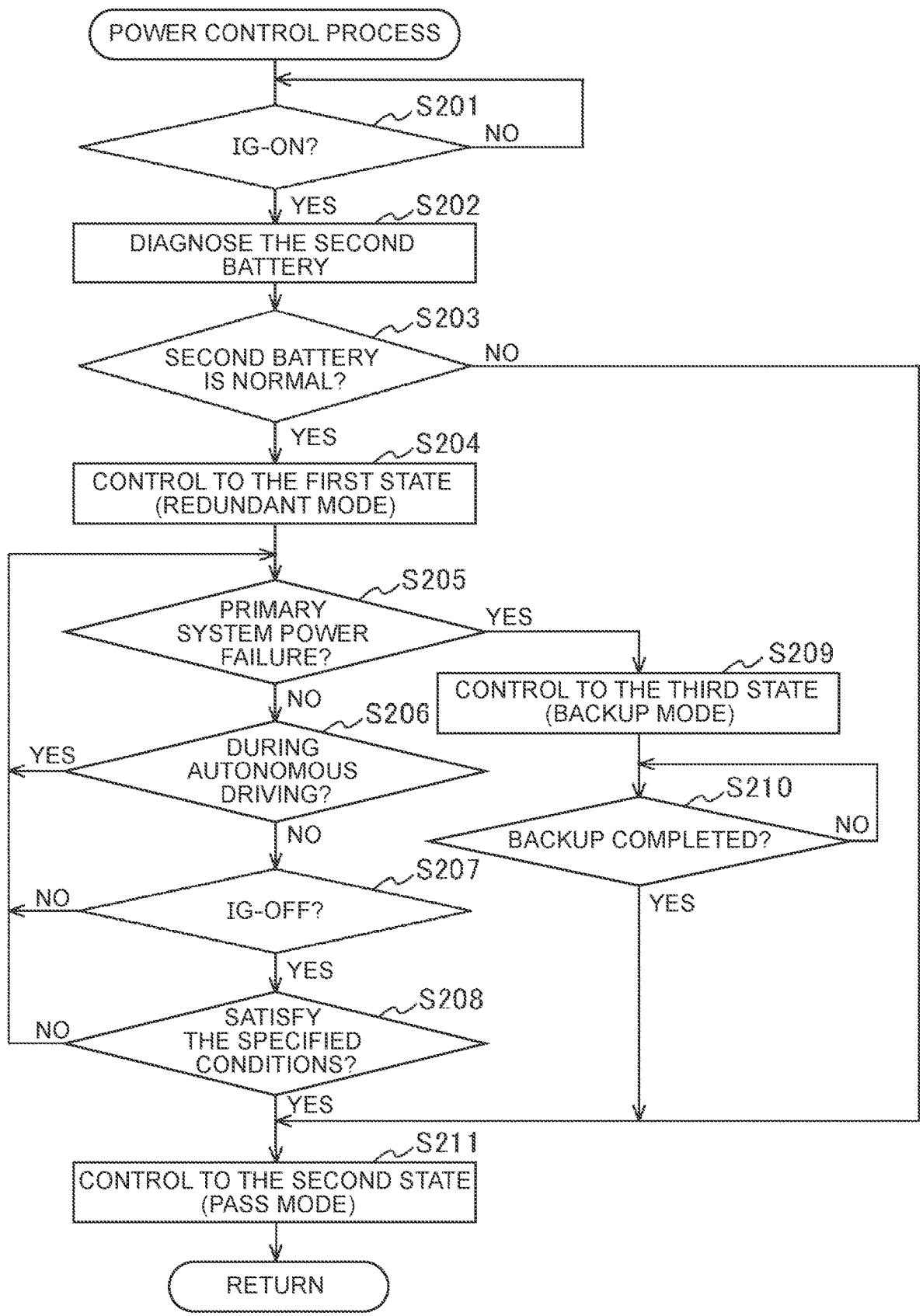
FIG. 2 is a flowchart illustrating a power supply control process executed by the power supply control device.

Next, the control performed by the power supply control device 14 according to the present embodiment will be described with further reference to FIGS. 2 to 6. FIG. 2 is a flowchart illustrating a procedure of a power supply control process executed by each configuration of the power supply control device 14.

(S201 of Steps)

The diagnostic unit 142 determines whether or not the power supply state of the vehicles acquired by the acquisition unit 141 is turned IG-ON. That is, the diagnostic unit 142 determines whether or not the power supply state of the vehicles has been switched from off (IG-OFF) to on (IG-ON).

When the diagnostic unit 142 determines that the power supply state of the vehicle is turned on (IG-ON) (step S201: Yes), the process proceeds to step S202, and when it is determined that the power supply state of the vehicle is not turned on (IG-ON) (step S201: No), it waits until the power supply state is turned on (IG-ON).

(S202 of Steps)

The diagnostic unit 142 performs a predetermined diagnosis process on the second battery 12. In this predetermined diagnosis process, it is diagnosed whether or not the second battery 12 is in a normal state that can be used as a backup power source of the first battery 11. For example, the diagnostic unit 142 determines whether or not the voltage, the current, the power storage rate (SOC), and the like of the second battery 12 satisfy a predetermined reference value.

When the second battery 12 is diagnosed by the diagnostic unit 142, the process proceeds to step S203.

(S203 of Steps)

The diagnostic unit 142 determines whether or not the second battery 12 is in a normal condition based on the diagnosis by the above-described step S202. For example, the diagnostic unit 142 can determine that the second battery 12 is in a normal condition when the voltage, the current, the power storage rate (SOC), and the like are equal to or greater than a predetermined reference value.

When the diagnostic unit 142 determines that the second battery 12 is in a normal state (step S203: Yes), the process proceeds to step S204, and when it is determined that the second battery 12 is not in a normal state (step S203: No), the process proceeds to step S211.

(S204 of Steps)

The control unit 145 controls a connection state of the first battery 11, the second battery 12, the first load 21, and the second load 22 to a first state (redundant mode) in which power is supplied from the first battery 11 to the first load 21 and the second battery 12, and power is also supplied from the second battery 12 to the second load 22.

Figure 3:
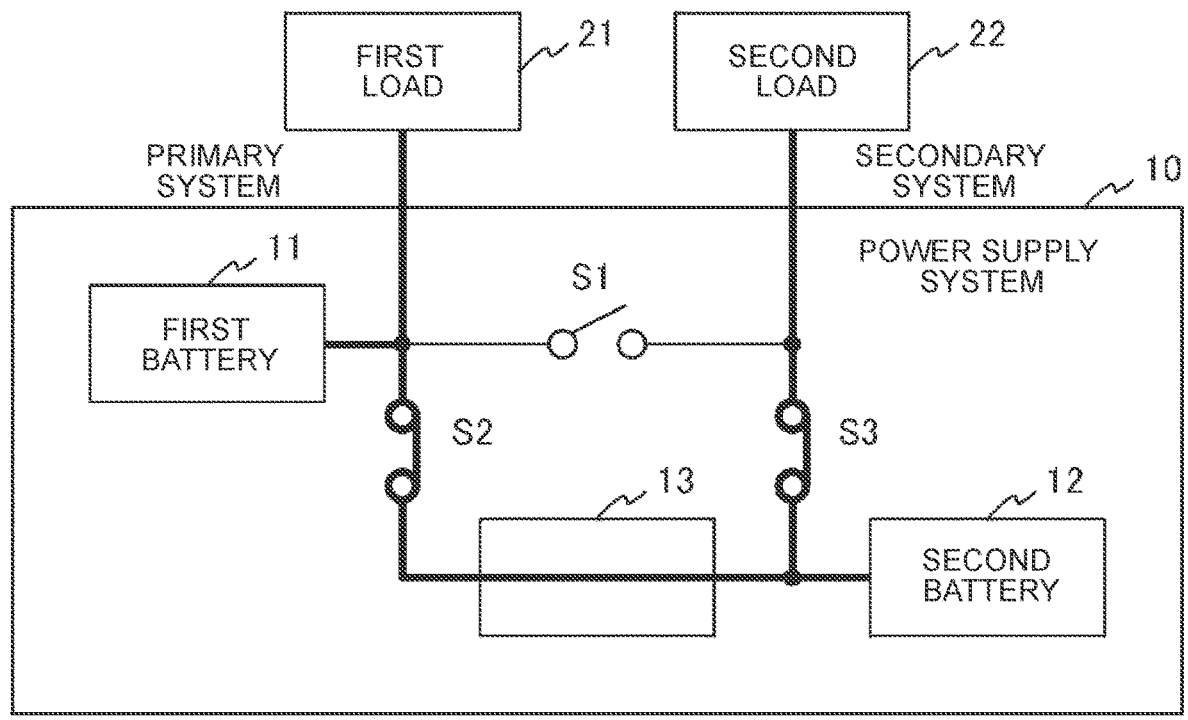
FIG. 3 shows the path of the power supply of the power supply system in a first state (redundant mode)

FIG. 3 is a diagram illustrating a path of power supply of the power supply system 10 in the first state (redundant mode). As shown in FIG. 3, in the first state (redundant mode), the first switch SW1 is opened and the second switch SW2 and the third switch SW3 are closed. By this path, the primary system and the secondary system are separated from each other by DCDC converter 13, power is supplied from the first battery 11 to the first load 21 of the primary system, and power is supplied in parallel to the second load 22 of the secondary system from the first battery 11 and the second battery 12 via DCDC converter 13.

In the redundant power supply configuration shown in the first state, even when an abnormality due to a power failure or the like occurs in the primary system, since the effect on the secondary system due to the abnormality is interrupted by DCDC converter 13, it is possible to maintain at least the required vehicular function by continuing the electric power to the second load 22 in the secondary system. Further, even when an abnormality due to a power failure or the like occurs in the secondary system, since the effect on the primary system due to the abnormality is interrupted by DCDC converter 13, the vehicular function can be maintained by continuing the power supplied to the first load 21 in the primary system. When no anomaly occurs in the primary system and the secondary system, the electric power to the second load 22 is supplied from the first battery 11 via DCDC converter 13, so that the electric power stored in the second battery 12 can be minimized.

When the control unit 145 controls the connected states of the first battery 11, the second battery 12, the first load 21, and the second load 22 to the first state (redundant mode), the process proceeds to step S205.

(S205 of Steps)

The control unit 145 determines whether or not a power failure has occurred due to a ground fault or the like in the primary system. The presence or absence of a power failure can be determined by, for example, monitoring the voltage and current of the first battery 11.

When the control unit 145 determines that a power failure has occurred in the primary system (step S205, Yes), the process proceeds to step S209, and when it is determined that a power failure has not occurred in the primary system (step S205, No), the process proceeds to step S206.

(S206 of Steps)

The control unit 145 determines whether or not the vehicle is in automatic driving. Whether the vehicle is in the autonomous driving state or the manual driving state can be determined, for example, by acquiring predetermined information from another in-vehicle device (such as an autonomous driving ECU) that controls the autonomous driving function (not shown).

When the control unit 145 determines that the vehicle is in autonomous driving (step S206, Yes), the process proceeds to step S205, and when it is determined that the vehicle is not in autonomous driving (step S206, No), the process proceeds to step S207.

(S207 of Steps)

The diagnostic unit 142 determines whether or not the power supply state of the vehicles acquired by the acquisition unit 141 is turned IG-OFF. That is, the diagnostic unit 142 determines whether or not the power supply state of the vehicles has been switched from on (IG-ON) to off (IG-OFF).

When the diagnostic unit 142 determines that the power supply state of the vehicle is turned off (IG-OFF) (step S207: Yes), the process proceeds to step S208, and when it is determined that the power supply state of the vehicle is not turned off (IG-OFF) (step S207: No), the process proceeds to step S205.

(S208 of Steps)

The control unit 145 determines whether or not the vehicle satisfies a predetermined condition. The predetermined condition is a condition related to a vehicle that can determine that the first state (redundant mode) having a redundant power supply configuration may be cancelled. More specifically, the following three conditions can be mainly exemplified as the predetermined conditions.

Figure 6:
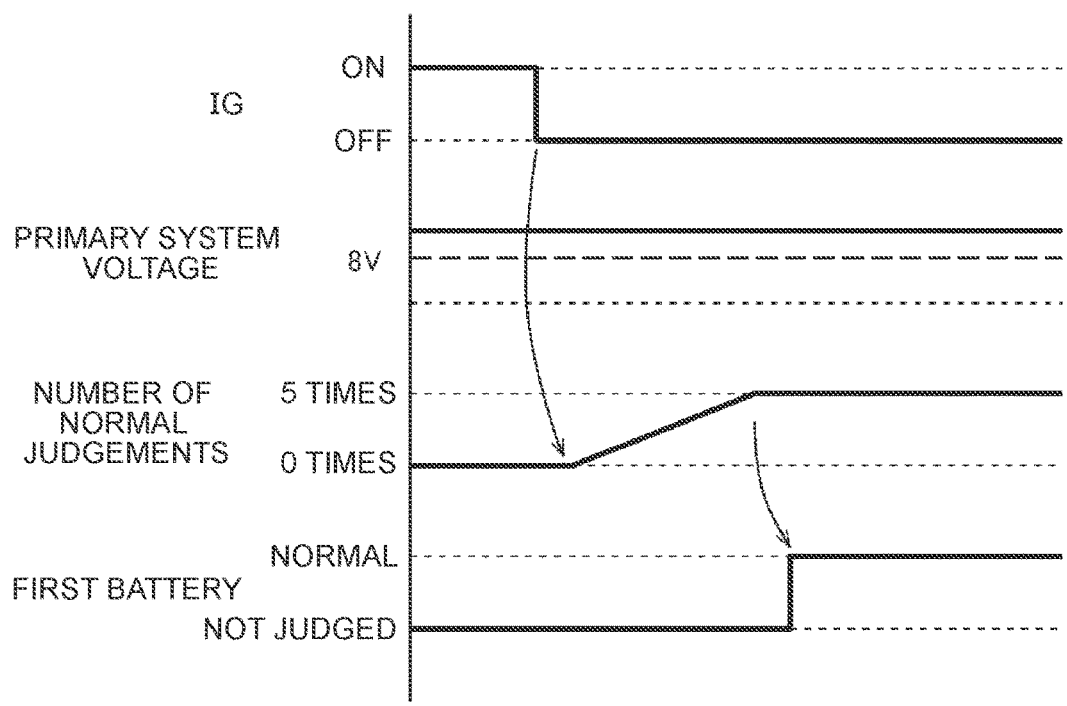
FIG. 6 is a diagram for explaining an example of conditions under which the first state (redundant mode) may be released.

Condition 1: The diagnostic unit 142 diagnoses that the first battery 11 is normal Condition 2: The speed of the vehicle detected by the detection unit 143 indicates a stop state Condition 3: It is determined by the determination unit 144 that the parking lock has been completed Condition 1 is based on the idea that if the first battery 11 is normal, the second battery 12 is extremely unlikely to be used and a redundant power supply configuration is not necessary. As a determination method of the condition 1, for example, as illustrated in FIG. 6, after the power supply state of the vehicle is determined to be off (IG-OFF) in the above-described step S207, the voltage of the first battery 11 may be sampled at a predetermined cycle (for example, 8 ms), the number of consecutive times that the sampled voltage becomes equal to or greater than a predetermined normal determination threshold value (for example, 8V) may be counted, and if the number of consecutive times becomes equal to or greater than a predetermined number of times (for example, 5 times), the first battery 11 may be determined to be normal. Alternatively, after off of the power supply state (IG-OFF) of the vehicles is determined in the above-described S207 of steps, the voltage of the first battery 11 may be monitored, and if the duration of the voltage being equal to or greater than the predetermined normal determination threshold is equal to or greater than the predetermined first time (e.g., 40 ms), it may be determined that the first battery 11 is normal. Note that the determination may be made using the current of the first battery 11 instead of the voltage of the first battery 11.

Condition 2 is based on the idea that it is highly likely that the vehicle will stop if the vehicle speed continues to be extremely low. As a determination method of the condition 2, for example, if the time when the speed of the vehicle becomes equal to or less than a predetermined value (for example, 5 km/h) is continued for a predetermined second time (for example, 5 s) after off (IG-OFF) of the power supply state of the vehicle is determined in the above-described step S207, it may be determined that the speed of the vehicle indicates the stop state.

Condition 3 is based on the idea that the vehicle in the parking lock state is unlikely to start moving. As a determination method of the condition 3, for example, if the state in which the disc brake pad of the electric brake actuator is pressed against the brake rotor can be confirmed after the off (IG-OFF) of the power supply state of the vehicle is determined in the above-described step S207, it may be determined that the parking lock is completed.

It should be noted that, in addition to the above, the electronic control unit ECU (not shown) for controlling the autonomous driving may receive a signal indicating that redundancy of the power supply with respect to the loads is no longer necessary.

When the control unit 145 determines that the vehicle satisfies the predetermined condition (step S208: Yes), the process proceeds to step S211, and when it determines that the vehicle does not satisfy the predetermined condition (step S208: No), the process proceeds to step S205.

(S209 of Steps)

The control unit 145 controls the connection state of the first battery 11, the second battery 12, the first load 21, and the second load 22 to a third state (backup mode) in which the first battery 11 and the second battery 12 are electrically separated from each other and power is supplied from the second battery 12 to the second load 22.

Figure 5:
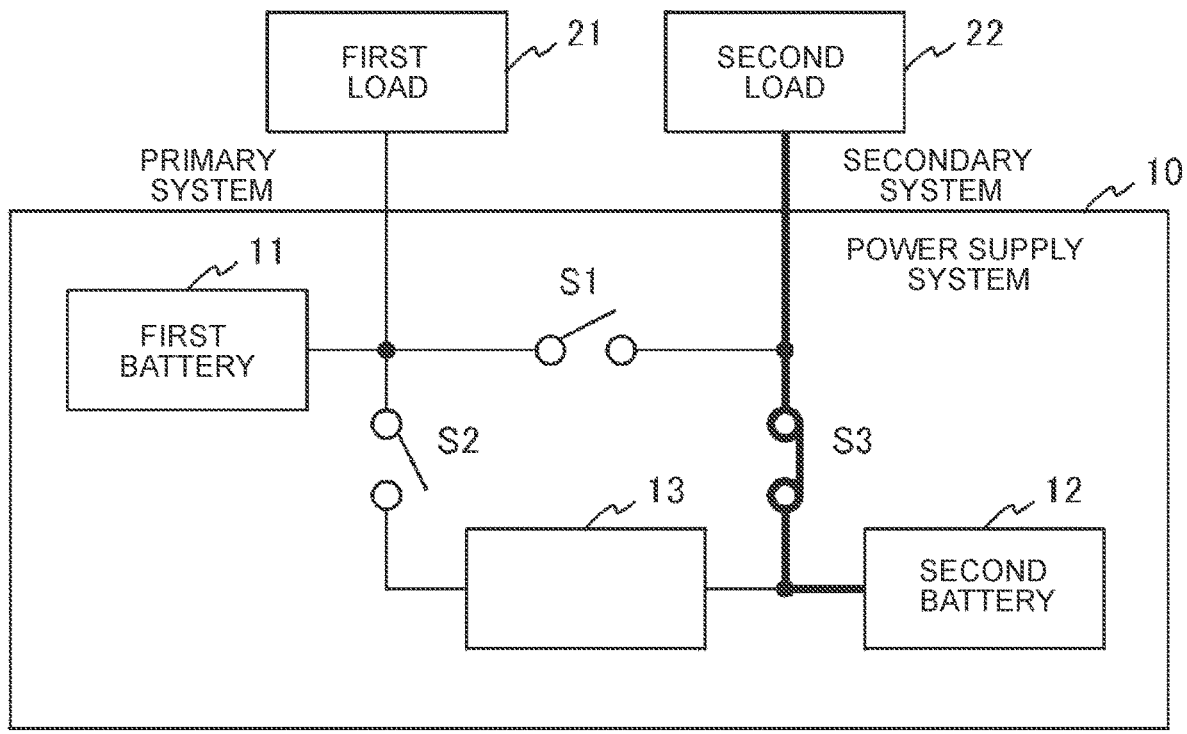
FIG. 5 shows the path of the power supply of the power supply system in a third state (backup mode)

FIG. 5 is a diagram illustrating a path of power supply of the power supply system 10 in the third state (backup mode). As shown in FIG. 5, in the third state (backup mode), the first switch SW1 and the second switch SW2 are opened, and the third switch SW3 is closed. This path forms a backup power supply configuration in which the first system in which an abnormality has occurred due to a power failure is electrically disconnected from the second system, and power is supplied from the second battery 12 to the second load 22 of the secondary system.

According to the backup power supply configuration shown in the third state, it is possible to cut off the influence of the abnormality caused by the power supply failure occurring in the primary system from reaching the secondary system, and to continue the power supply to the second load 22 by the second battery 12 in the secondary system. Therefore, the required vehicle function that would have been lost due to the shutdown of the first load 21 can be maintained by the continuation of the operation of the second load 22.

When the control unit 145 controls the connecting states of the first battery 11, the second battery 12, the first load 21, and the second load 22 to the third state (backup mode), the process proceeds to step S210.

(S210 of Steps)

The control unit 145 determines whether or not the backup has been completed by performing the power supply from the second battery 12 to the second load 22. Completion of the backup typically refers to completion of the control of the necessary vehicle functions to be performed when an abnormality occurs in the primary system, for example, it can be exemplified that the power supply to the second load 22 is continued until the retreat action of stopping the vehicle under automatic driving in an emergency by bringing the vehicle toward the road shoulder or the like is completed.

When the control unit 145 determines that the backup has been completed (step S210, Yes), the process proceeds to step S211, and when it is determined that the backup has not been completed (step S210, No), it waits until the backup is completed.

(S211 of Steps)

The control unit 145 controls a connection state of the first battery 11, the second battery 12, the first load 21, and the second load 22 to a second state (pass mode) in which power is supplied from the first battery 11 to the first load 21 and the second battery 12.

Figure 4:
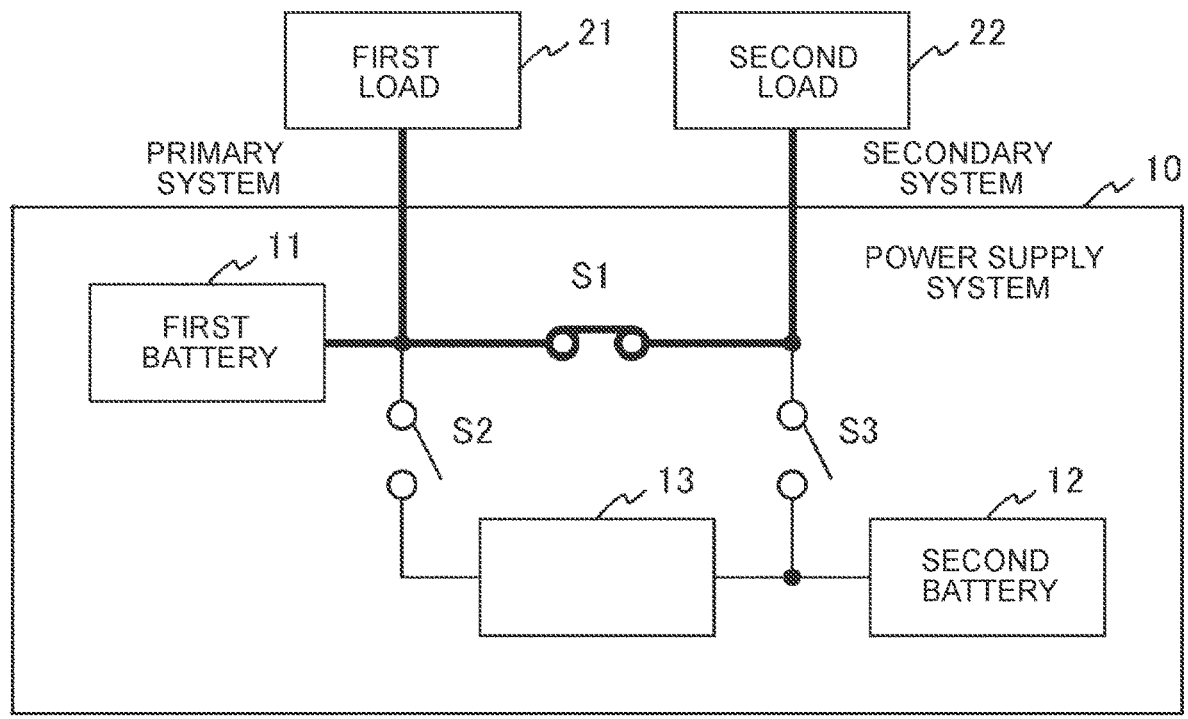
FIG. 4 shows the path of the power supply of the power supply system in a second state (pass mode)

FIG. 4 is a diagram illustrating a path of power supply of the power supply system 10 in the second state (pass mode). As shown in FIG. 4, in the second state (pass mode), the first switch SW1 is closed and the second switch SW2 and the third switch SW3 are opened. This path forms a power supply configuration in which power is supplied from the first battery 11 to the first load 21 of the primary system and the second load 22 of the secondary system, and the second battery 12 is separated from the secondary system.

In the power supply configuration shown in the second state, since the second battery 12 is disconnected from the secondary system, generation of power consumption from the second battery 12 to the second load 22 can be avoided, and deterioration progress of the second battery 12 can be suppressed. Further, since the life of the second battery 12 can be delayed, the frequency of battery replacement is reduced, and the burden on the user and the environment can be reduced.

When the control unit 145 controls the connected states of the first battery 11, the second battery 12, the first load 21, and the second load 22 to the second state (pass mode), the process returns to S201 of steps.

Operations and Effects

As described above, in the power supply control device 14 according to the embodiment of the present disclosure, the second battery 12 is diagnosed when the power supply state of the vehicle is switched from off (IG-OFF) to on (IG-ON). Then, when it is determined that the second battery 12 is in a normal state and a redundant power supply configuration is possible, power is supplied from the first battery 11 to the first load 21 and the second battery 12, and the first switch SW1, the second switch SW2, and the third switch SW3 are controlled in a first state (redundant mode) in which power can be supplied from the second battery 12 to the second load 22.

By this control, when the second battery 12 is in a state of being usable as a redundant power supply, even in a situation where a redundant power supply configuration such as automated driving is not required, the power supply state of the vehicle can be made redundant during the period from IG-ON to IG-OFF. Therefore, it is possible to extend the vehicle to a state in which necessary functions in the first load 21 can be backed up at any time.

In addition, in the power supply control device 14 according to the embodiment of the present disclosure, for example, the first battery 11 is diagnosed when the power supply state of the vehicle is switched from on (IG-ON) to off (IG-OFF). When it is determined that the first battery 11 is in a normal state and the redundant power supply configuration can be released, the first switch SW1, the second switch SW2, and the third switch SW3 are controlled in a second state (pass mode) in which power is only supplied from the first battery 11 to the first load 21 and the second battery 12.

By this control, in a situation where it is considered that a redundant power supply configuration is not necessary, for example, when the vehicle is parked, it is possible to electrically disconnect the second battery 12 from the power supply configuration of the vehicle after confirming that the first battery 11 is normal. Therefore, it is possible to prevent the number of times of charging and discharging of the second battery 12 from being unnecessarily increased, and it is possible to suppress the deterioration of the second battery 12 from progressing. Further, since the discharge of the second battery 12 at the time of turning off the vehicle power supply can be suppressed, it is possible to shorten the charging time of the electric power required until the start of traveling when the vehicle power supply is turned on next time. Further, since the switching to the second state (pass mode) is controlled after the diagnosis of the first battery 11 is performed, it is possible to prevent the redundant power supply configuration from being released immediately when the power supply state of the vehicles is turned IG-OFF.

Although an embodiment of the present disclosure has been described above, the present disclosure can be regarded as a control method executed by a power supply control device including not only a power supply control device but also a processor and a memory, a control program of the control method, a computer-readable non-transitory recording medium storing the control program, or a vehicle equipped with a power supply control device.

The power supply control device and the like of the present disclosure can be used for a vehicle having a plurality of batteries redundantly.

What is claimed is:

1. A power supply control device that controls power supply to a load of a vehicle that uses a first battery and a second battery, the power supply control device comprising:
    an acquisition unit that acquires a power supply state of the vehicle;
    a diagnostic unit that performs diagnostics of the second battery when the power supply state of the vehicle is switched from off to on;
    a control unit that controls an electrical connection state between the load and the second battery, and
    a detection unit that detects a speed of the vehicle,
    wherein the control unit executes control to establish a first state in which power is able to be supplied from the second battery to the load when the diagnostic unit diagnoses that the second battery is normal; and
    the control unit executes control to establish a second state in which the second battery is electrically disconnected from the load when the speed of the vehicle continues to be equal to or less than a predetermined speed for a second time after the power supply state of the vehicle is switched from on to off.

2. The power supply control device according to claim 1, wherein:
    the diagnostic unit performs diagnostics of the first battery when the power supply state of the vehicle is switched from on to off; and
    when the diagnostic unit diagnoses that the first battery is normal, the control unit executes control to establish a second state in which the second battery is electrically disconnected from the load.

3. The power supply control device according to claim 2, wherein the diagnostic unit diagnoses that the first battery is normal when a voltage of the first battery continues to be equal to or more than a predetermined threshold value for a first time after the power supply state of the vehicle is switched from on to off.

4. The power supply control device according to claim 1, further comprising a determination unit that determines a state of a parking lock of the vehicle, wherein the control unit executes control to establish a second state in which the second battery is electrically disconnected from the load in a case where the determination unit determines that the parking lock is completed when the power supply state of the vehicle is switched from on to off.

5. The power supply control device according to claim 4, wherein:
    the load includes an electric brake actuator provided with a disc brake pad and a brake rotor; and
    completion of the parking lock is a state where the disc brake pad is pressed against the brake rotor.

6. A control method executed by a power supply control device that controls power supply to a load of a vehicle that uses a first battery and a second battery, the control method comprising:
    a step of acquiring a power supply state of the vehicle;
    a step of performing diagnostics of the second battery when the power supply state of the vehicle is switched from off to on;
    a step of detecting a speed of the vehicle;
    a step of executing control to establish a first state in which power is able to be supplied from the second battery to the load when the second battery is diagnosed as normal; and
    a step of executing control to establish a second state in which the second battery is electrically disconnected from the load when the speed of the vehicle continues to be equal to or less than a predetermined speed for a second time after the power supply state of the vehicle is switched from on to off.

7. A non-transitory storage medium storing a control program causing a computer of a power supply control device that controls power supply to a load of a vehicle that uses a first battery and a second battery to execute processes comprising:
    a step of acquiring a power supply state of the vehicle;
    a step of performing diagnostics of the second battery when the power supply state of the vehicle is switched from off to on;
    a step of detecting a speed of the vehicle;
    a step of executing control to establish a first state in which power is able to be supplied from the second battery to the load when the second battery is diagnosed as normal; and
    a step of executing control to establish a second state in which the second battery is electrically disconnected from the load when the speed of the vehicle continues to be equal to or less than a predetermined speed for a second time after the power supply state of the vehicle is switched from on to off.

* * * * *